(12) United States Patent
Yankov et al.

(10) Patent No.: US 11,370,154 B2
(45) Date of Patent: Jun. 28, 2022

(54) MULTI-MATERIAL HOT RUNNER NOZZLE

(71) Applicant: HUSKY INJECTION MOLDING SYSTEMS LTD., Bolton (CA)

(72) Inventors: Peter Yankov, Bolton (CA); William Steven Keir, Aurora (CA)

(73) Assignee: Husky Injection Molding Systems Ltd., Bolton (CA)

( * ) Notice: Subject to any disclaimer, the term of this patent is extended or adjusted under 35 U.S.C. 154(b) by 556 days.

(21) Appl. No.: 16/335,057

(22) PCT Filed: Sep. 14, 2017

(86) PCT No.: PCT/CA2017/051082
§ 371 (c)(1),
(2) Date: Mar. 20, 2019

(87) PCT Pub. No.: WO2018/064751
PCT Pub. Date: Apr. 12, 2018

(65) Prior Publication Data
US 2019/0275717 A1   Sep. 12, 2019

Related U.S. Application Data

(60) Provisional application No. 62/404,280, filed on Oct. 5, 2016.

(51) Int. Cl.
*B29C 45/16* (2006.01)
*B29C 45/27* (2006.01)

(52) U.S. Cl.
CPC ........ *B29C 45/1603* (2013.01); *B29C 45/278* (2013.01); *B29C 2045/279* (2013.01)

(58) Field of Classification Search
CPC .............. B29C 45/1603; B29C 45/278; B29C 2045/279
See application file for complete search history.

(56) References Cited

U.S. PATENT DOCUMENTS 5,104,305 A   4/1992   Kawaguchi et al.
5,143,733 A * 9/1992   Von Buren ............. B29C 45/02
                                              264/328.13
(Continued)

FOREIGN PATENT DOCUMENTS

CN      1215657 A       5/1999
DE   102006040182 A1    3/2008
(Continued)

OTHER PUBLICATIONS

PCT International Search Report, dated Dec. 18, 2017, 3 pages.

*Primary Examiner* — Joseph S Del Sole
*Assistant Examiner* — Baileigh Kate Darnell

(57) ABSTRACT

An injection molding machine includes a nozzle with a nozzle body having inner and outer flow channels, and at least one intermediate flow channel in between. A valve stem is slideable in the inner flow channel and moveable between open and closed positions. In a first closed position, the valve stem blocks an outlet of the inner flow channel but not outlets of the outer or at least one intermediate flow channels. In the open position, melt exiting the at least one intermediate flow channel simultaneously intersect melt exiting the outer and inner flow channels. The flow channels may be arranged concentrically. The outlets of the flow channel may be separated by a knife edge. The outlets of the flow channels may be adjacent to one another. The inner and outer flow channels may be substantially perpendicular to one another, but not to the at least one intermediate flow channel.

29 Claims, 9 Drawing Sheets

(56) References Cited

U.S. PATENT DOCUMENTS

| | | | |
|---|---|---|---|
| 5,162,121 | A | 11/1992 | Kawaguchi et al. |
| 6,113,381 | A | 9/2000 | Gellert et al. |
| 6,274,075 | B1 | 8/2001 | Gellert et al. |
| 6,350,401 | B1 | 2/2002 | Gellert et al. |
| 6,524,089 | B1 | 2/2003 | Nightingale |
| 7,306,446 | B2 | 12/2007 | Sabin et al. |
| 8,469,687 | B2 | 6/2013 | Ten et al. |
| 2004/0247739 | A1 | 12/2004 | Sabin et al. |
| 2006/0024402 | A1* | 2/2006 | Goinski ............. B29C 45/2711 425/568 |
| 2009/0096129 | A1 | 4/2009 | Hirota et al. |
| 2011/0123414 | A1 | 5/2011 | Ahern et al. |
| 2013/0207289 | A1* | 8/2013 | Babin ................ B29C 45/1684 264/40.1 |
| 2014/0248385 | A1* | 9/2014 | Ten ........................ E02B 3/066 425/130 |
| 2014/0319725 | A1 | 10/2014 | Duffy et al. |
| 2014/0327176 | A1 | 11/2014 | Chiba et al. |

FOREIGN PATENT DOCUMENTS

| | | | |
|---|---|---|---|
| EP | 0378138 | A2 | 7/1990 |
| EP | 2781330 | A1 | 9/2014 |
| JP | 6399918 | A | 5/1988 |
| JP | H02-229022 | A | 9/1990 |
| JP | H02-229023 | A | 9/1990 |
| JP | 11235737 | A | 8/1999 |
| JP | 2005343099 | A | 12/2005 |
| WO | 2016131130 | A1 | 8/2016 |

\* cited by examiner

MULTI-MATERIAL HOT RUNNER NOZZLE

FIELD

The disclosed embodiments are generally directed to injection molding machines and more particularly to nozzles that transfer multiple molding materials to mold cavities.

BACKGROUND

Injection molding machines are used to produce plastic molded parts such as, for example, preforms of the type that are blow moldable into beverage containers. Typically, hot runners include a manifold that delivers hot melt from a sprue bushing to one or more nozzles, which, in turn, deliver the melt to individual mold cavities. In some hot runners, the flow of molding material through the nozzles is controlled by valve stems that are actuated back and forth to open and close gates at the ends of the nozzles.

Some injection molding machines may include a nozzle assembly that is arranged to dispense more than one layer of melt and/or more than one type of melt to the mold cavity, such as via co-injection. For example, the nozzle assembly may be arranged to dispense inner and outer melt streams into a molded part, with an intermediate melt material sandwiched in between. In such an example, the inner and outer layers may include a first melt material and the intermediate melt material may be a second, different melt material.

SUMMARY

According to one embodiment, an injection molding machine having a co-injection nozzle for transferring melt to a mold cavity is disclosed. The co-injection nozzle includes a nozzle body having an inner flow channel, an outer flow channel, and at least one intermediate flow channel in between the inner and outer flow channels, and a valve stem slidably received in the inner flow channel and moveable between an open position and one or more closed positions. In a first closed position, the valve stem blocks an outlet of the inner flow channel but does not block an outlet of the outer flow channel or an outlet of the at least one intermediate flow channel. Respective outlets of the inner channel, the outer channel and the at least one intermediate flow channels are immediately adjacent to one another.

According to another embodiment, an injection molding machine having a co-injection nozzle for transferring melt to a mold cavity is disclosed. The co-injection nozzle includes a nozzle body having first and second tip pieces, an inner flow channel, an outer flow channel, and at least one intermediate flow channel in between the inner and outer flow channels, and a valve stem slidably received in the inner flow channel and moveable between an open position and one or more closed positions. The flow channels are arranged concentrically, with the first tip piece separating the at least one intermediate channel and the outer channel and the second tip piece separating the inner channel and the at least one intermediate channel. In a first closed position, the valve stem blocks an outlet of the inner flow channel but does not block an outlet of the outer flow channel or an outlet of the at least one intermediate flow channel. A downstream end of the first tip piece includes a first knife edge that tapers to a first radiused edge between the outlets of the at least one intermediate flow channel and the outer flow channel. A downstream end of the second tip piece includes a second knife edge that tapers to a second radiused edge between the outlets of the at least one intermediate flow channel and the inner flow channel.

According to still another embodiment, an injection molding machine having a co-injection nozzle for transferring melt to a mold cavity is disclosed. The co-injection nozzle includes a nozzle body having an inner flow channel, an outer flow channel, and at least one intermediate channel in between the inner and outer flow channels, and a valve stem slidably received in the inner flow channel and moveable between an open position and one or more closed positions. In a first closed position, the valve stem blocks an outlet of the inner flow channel but does not block an outlet of the outer flow channel or an outlet of the at least one intermediate flow channel. In the open position, a stream of melt exiting the at least one intermediate flow channel simultaneously intersects a stream of melt exiting the outer flow channel and a stream of melt existing from the inner flow channel.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Injection molding machines are used to produce plastic molded parts such as, for example, preforms of the type that are blow moldable into beverage containers. Typically, such injection molding machines include a manifold that passes melted molding material, also referred to as melt, to nozzles that, in turn, pass the melt to individual mold cavities. In some hot runners, the nozzles are arranged to pass more than one type of melt into the same mold cavity, such as via co-injection. For example, a co-injection nozzle may dispense inner and outer layers, with an intermediate layer being sandwiched in between. In such an example the intermediate layer may include a core material layer such as a barrier material (e.g., an oxygen barrier material), which may be intended to protect contents of the molded article from outside contamination (e.g., oxidation). As will be appreciated, the inner and outer layer may be formed of a first melt material while the intermediate layer is formed of a second melt material, the second melt material being different from the first melt material.

Figure 1:
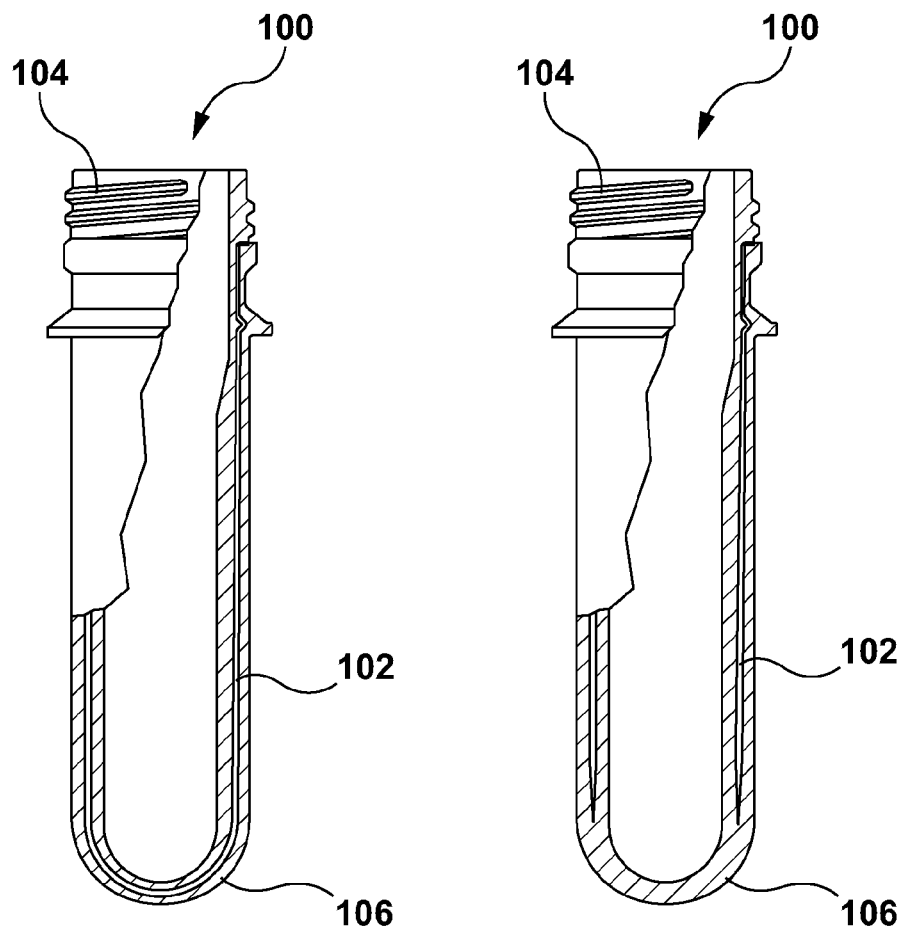
FIGS. 1A and 1B are cross-sectional schematic representations of prior art preforms formed by co-injection nozzles.

As shown in FIG. 1A, preforms 100 may include an encapsulated intermediate layer 102 that extends from a neck 104 of the preform to the bottom 106 of the preform. Without wishing to be bound by theory, in encapsulating this intermediate layer, it is necessary to stop the flow of the intermediate melt material at a prescribed time, such as at the end of injection of the intermediate layer. As shown in FIG. 1B, if the flow of the second melt material is not stopped in a timely manner, the intermediate layer will not be fully developed at the bottom of the preform. For example, fractions of the intermediate layer, or more than one intermediate layer, may be encapsulated in the bottom 106 of the preform. Or, in another example, no intermediate layer may exist at the bottom of the preform. As will be appreciated, in such preforms, the bottom is non-uniform and, thus, may be unstable. Additionally, fractions of the intermediate layer may remain in the nozzle and may contaminate subsequent injections.

Figure 2:
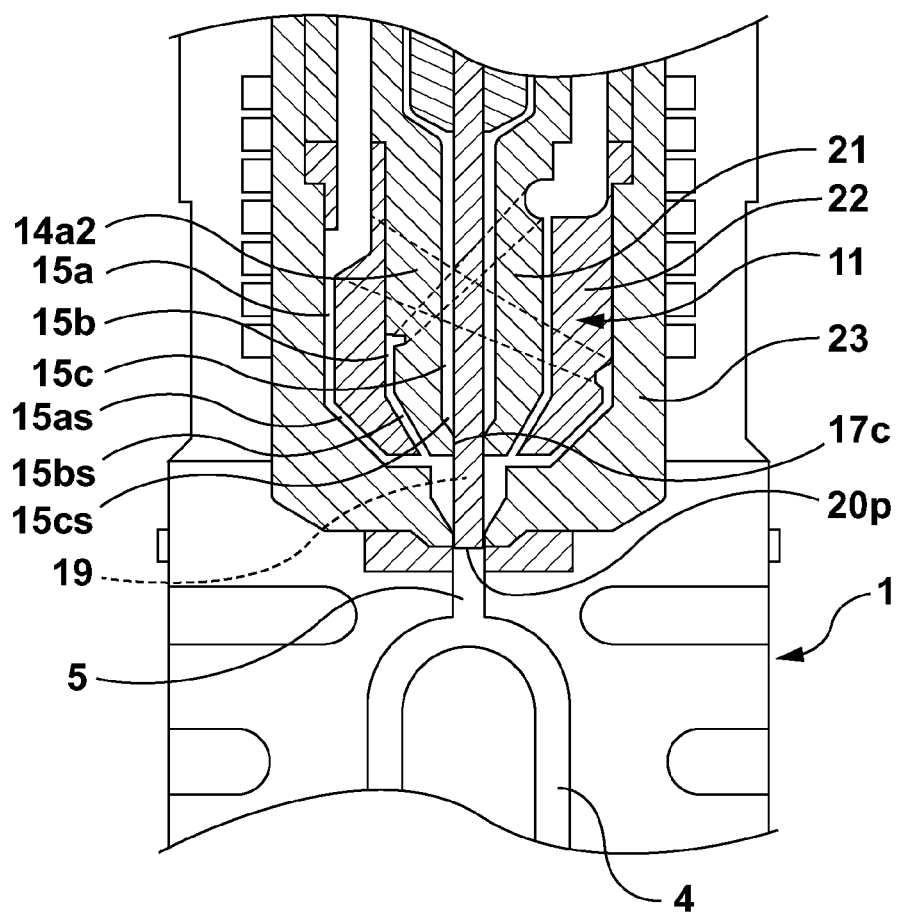
FIG. 2 is a cross-sectional schematic representation of a co-injection nozzle according to the prior art.

An example of a co-injection nozzle used to pass melt to a mold cavity is described in U.S. Patent Pub. No. 2014/0327176 and illustrated in FIG. 2. As is shown in FIG. 2, this nozzle includes three melt channels 15a-15c, with the outlets of these channels being spaced from one another, and a valve stem that reciprocates to start and stop melt flow. Such a nozzle, however, does not provide a satisfactory solution in all regards.

For example, Applicant has recognized that by placing the outlets of the melt channels of a co-injection nozzle adjacent to one another, various advantages may be realized. For purposes herein, having outlets adjacent to each other means that a first outlet is positioned immediately next to a second outlet such that there is no appreciable space between the first and second outlets. Applicant has also recognized that advantages may be realized when an outlet of an inner melt channel is substantially perpendicular to an outlet of an outer melt channel, but not substantially perpendicular to an outlet of the one or more intermediate melt channels. Applicant has also recognized that advantages may be realized by having a sharp edge (e.g., a knife edge) between the outlets of the intermediate and outer channels and/or the intermediate and inner channels. Applicant has further recognized that advantages may be realized when melt exiting an intermediate melt channel simultaneously intersects melt exiting the inner and outer melt channels.

As will be described, such arrangements may allow for the melt flow from the intermediate channel to be pinched, or stopped, in a more efficient manner. Without wishing to be bound by theory, this may lead to minimal amount of flushing from the inner and outer melt flows, which may reduce or even eliminate residual contamination of the outer or inner melt flows (e.g., of a core material) at the end of an encapsulation process. For example, melt from the inner and outer melt channels may flow into the intermediate melt channel during pinching, which may reduce or even eliminate residual melt from flowing out of the intermediate channel once the intermediate layer has been injected into the preform. Such arrangements also may reduce a length of a trailing edge of the intermediate layer (e.g., the edge near the bottom of the preform) in non-encapsulation processes in which the intermediate layer does not extend all the way to the bottom of the preform. For example, since the intermediate flow may be pinched in a more efficient manner, the length of the trailing edge of the intermediate layer maybe more precisely sized during the injection process.

To that end, embodiments disclosed herein include a hot runner having a co-injection nozzle with inner and outer melt channels and one or more intermediate melt channels positioned in between. In such embodiments, a valve stem may be slidably received in the inner channel and may reciprocate back and forth to start and stop melt flow. In some embodiments, the valve stem may move to a first closed position to stop melt flow of only the inner channel. As will be described, the valve stem may be arranged such that it may stop melt flow of the inner channel while allowing melt to flow from the outer channel and the one or more intermediate channels. As will be appreciated, in such embodiments, melt need not flow from both the intermediate and outer channels when the valve stem is in such a closed position. For example, melt may flow only from the outer channel when the valve stem is in the first closed position. In some embodiments, the valve stem may move to a second closed position to stop melt flow out of the nozzle. For example, the valve stem may move to block a gate to stop melt flow out of the inner, intermediate and outer channels.

In some embodiments, the inner channel is substantially perpendicular to the outer channel but not substantially perpendicular to the one or more intermediate channels. For example, the outlet of the intermediate channel(s) may be offset from a longitudinal axis of the inner channel by an angle less than 90° (e.g., between about 25°-75°). In some embodiments, the nozzle is arranged such that melt exiting the intermediate channel simultaneously intersects melt exiting the inner and outer channels.

Figure 3:
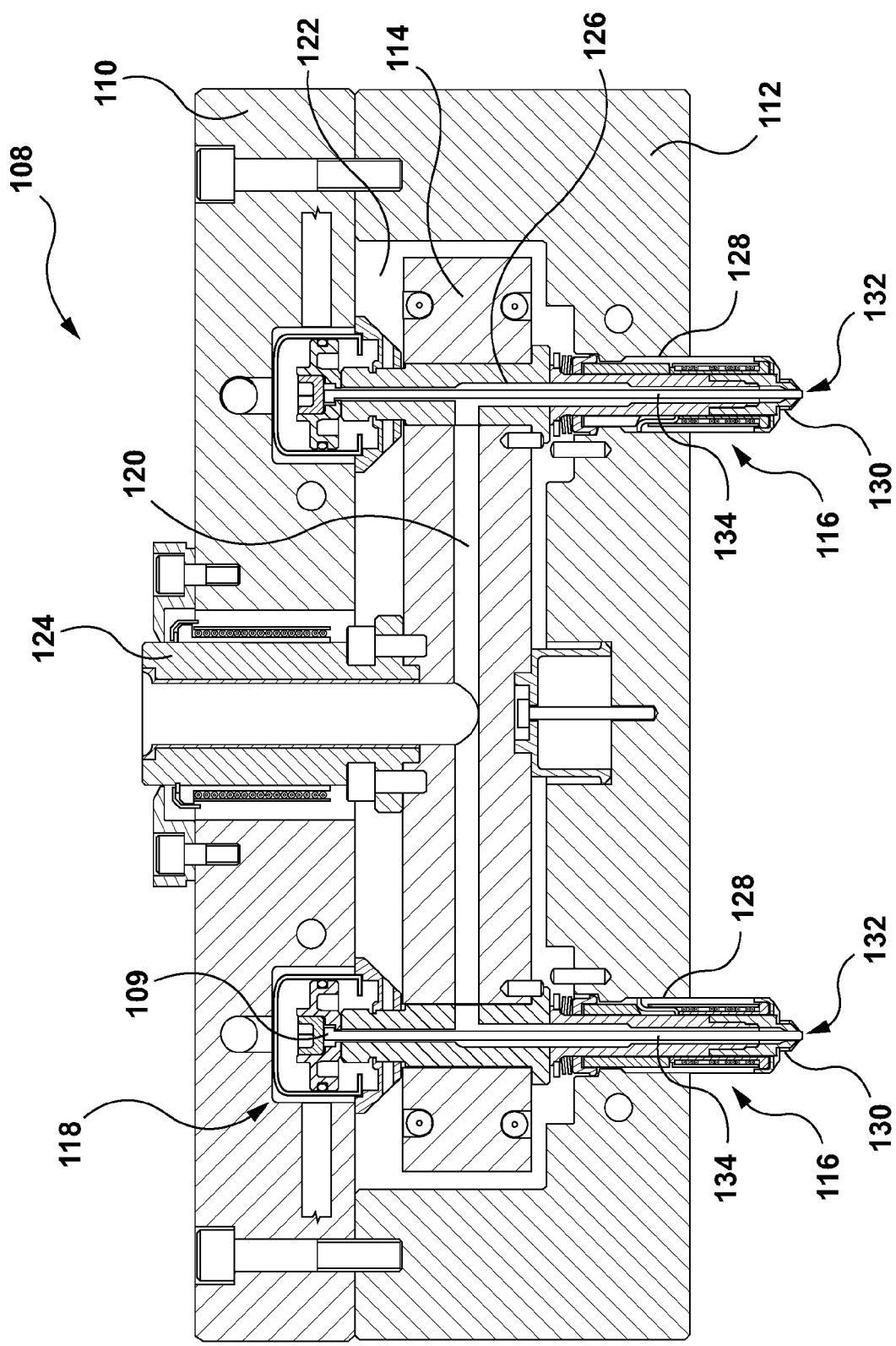
FIG. 3 is a cross-sectional schematic representation of a hot runner according to the prior art.

Turning now to the figures, FIG. 3, illustrates a typical valve gated hot runner 108, which includes a first plate 110 (also known as a backing plate), a second plate 112 (also known as a mold plate), a manifold 114, valve gated nozzles 116, actuators 118, and melt channels 120. The first and second plates 110, 112 may be made from a steel alloy and coupled together, as is well known. Once coupled, the first and second plates 110, 112 define a manifold pocket 122, within which the manifold 114 lies. The manifold 114 includes one or more melt channel(s) 120 configured to convey the melt from an input that is usually connected with a sprue bushing 124 to an output (usually called a drop 126). The sprue bushing 124 may be coupled with a machine nozzle (known and not depicted) of an injection unit (known and not depicted).

Although the nozzles 116 in FIG. 3 are each shown as having a single melt channel 120 fed by the same manifold 114, it will be appreciated that nozzle may have more than one melt channel 120 (e.g., with co-injection nozzles). As will be further appreciated, although a single manifold is shown as feeding melt to the melt channel in the each nozzle, the hot runner may include more than one manifold that feeds melt to each nozzle. For example, a first manifold may supply a first melt material to first and second melt channels, while a second manifold may supply a second melt material to a third melt channel.

As is known, the nozzle 116 may be supportively received in the nozzle hole 128 of the second plate 112 and may be operatively connected with the drop 126 of the manifold 114 (or manifolds), so that the nozzle 116 may receive the melt from the drop 126. The nozzle tip 130 may also be received in a mold gate of a mold assembly (known but not depicted) so that melt may flow from the nozzle 116 to a mold cavity (via the mold gate 132) of the mold assembly. Although two nozzles 116 are shown in this figure, one of skill in the art will appreciate that the hot runner may include only one nozzle or may include three or more nozzles.

As is also known, a valve stem 134 may be associated with the valve gated nozzle 108 such that it may be selectively moved between a retracted open position and a forward closed position, though valve gate nozzles have been developed where the valve stem is retracted to close and advanced to open. As such, embodiments described herein are not limited to the direction of valve stem closure. The valve stem 134 may extend from the backing plate 110 to a mold cavity (not shown), and an upstream end 109 of the valve stem 134 is connected to the actuator 118. As will be appreciated, the actuator 100 may be pneumatic, as is shown, hydraulic, or electric.

Figure 4:
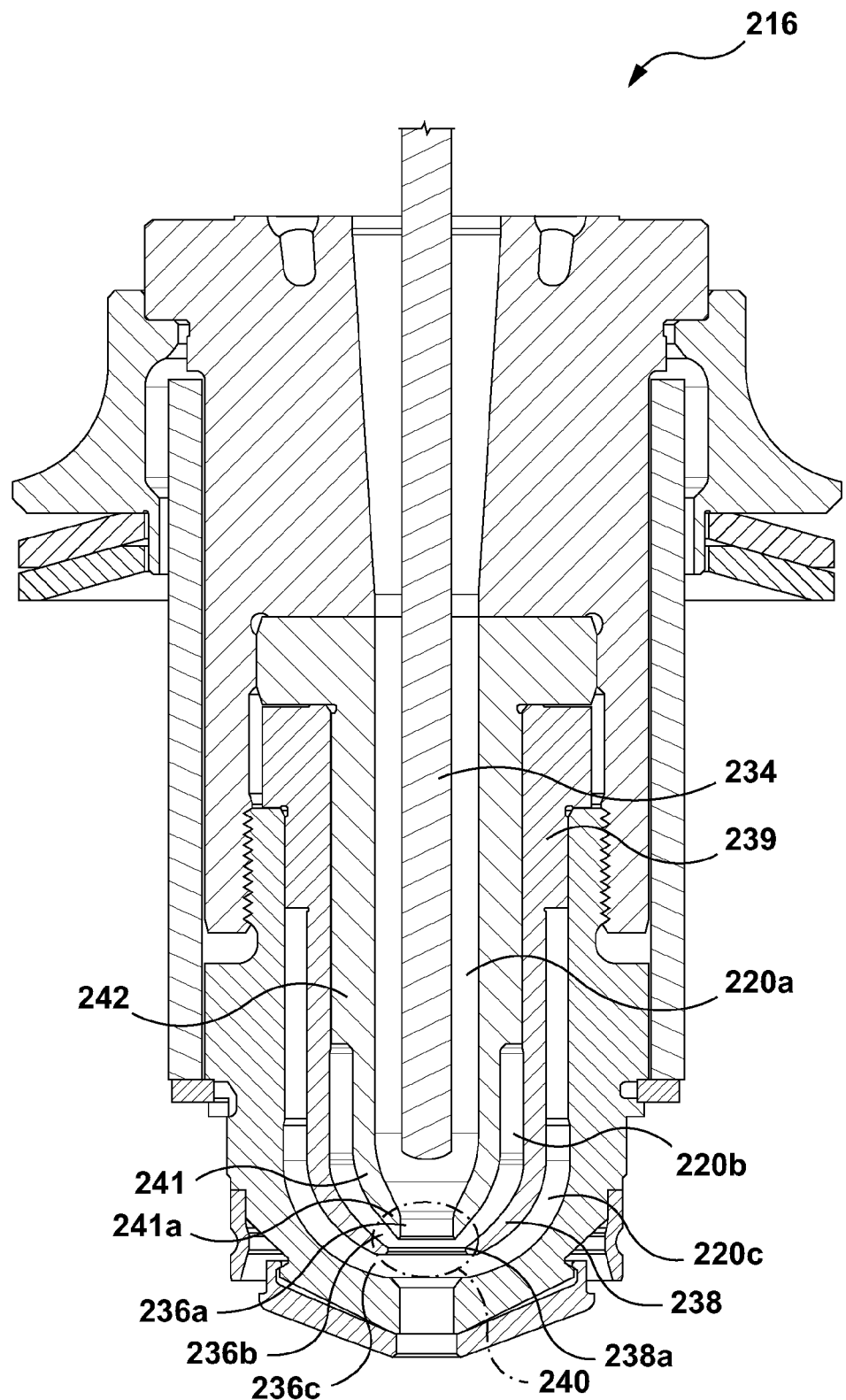
FIG. 4 is a cross-sectional schematic representation of a co-injection nozzle according to one embodiment, with a valve stem in an open position.

Turn now to FIG. 4, which shows an embodiment of a co-injection nozzle 216 according to the present disclosure. As shown in FIG. 4, the nozzle includes an inner melt channel 220a, an annular outer melt channel 220c, and an annular intermediate melt channel 220b disposed in between the inner melt channel and the outer annular melt channel. As will be appreciated, although only one intermediate melt channel is shown in this embodiment, in other embodiments, the nozzle may include more than one intermediate channel. For example, the nozzle may include two or more intermediate channels in between the inner and outer channels. As will be further appreciated, each of these channels may feed melt to the same mold cavity.

As illustrated in FIG. 4, the inner, intermediate, and outer melt channels 220a-220c are positioned adjacent to one another. That is, the respective outlets 236a-226c of the inner, intermediate, and outer melt channels 220a-220c are positioned immediately next to one another such that there is no appreciable space between them. For example, a downstream end 238 of a melt tip piece 239 separating the intermediate and outer melt channels may be arranged to have a knife edge 238a that tapers to a radiused edge between the outlets 236b, 236c of the intermediate and outer channels 220b, 220c. A similar knife edge 241a also may be formed on a downstream end 241 of a second melt tip piece 242 between the outlets 236a, 236b of the inner and intermediate channels 220a, 220b. In one embodiment, each knife edge 238a, 241a may have a small radius or chamfer at the tip thereof. The radius of tip preferably ranges in size between about 0.03 mm and 0.6 mm, and more preferably between 0.1 and 0.3 mm. In one embodiment, the radius tip of the knife edge 238a may be 0.3 mm and the radius tip of the knife edge 241a may be 0.1 mm. In some embodiments, the knife edge 238a between the intermediate and outer channels may be the same as the knife edge 241a between the intermediate and inner channels, although the knife edges also may be different. As will be appreciated, other suitable dimensions may be employed to establish such knife edges, as the invention is not limited in this regard.

Figure 5:
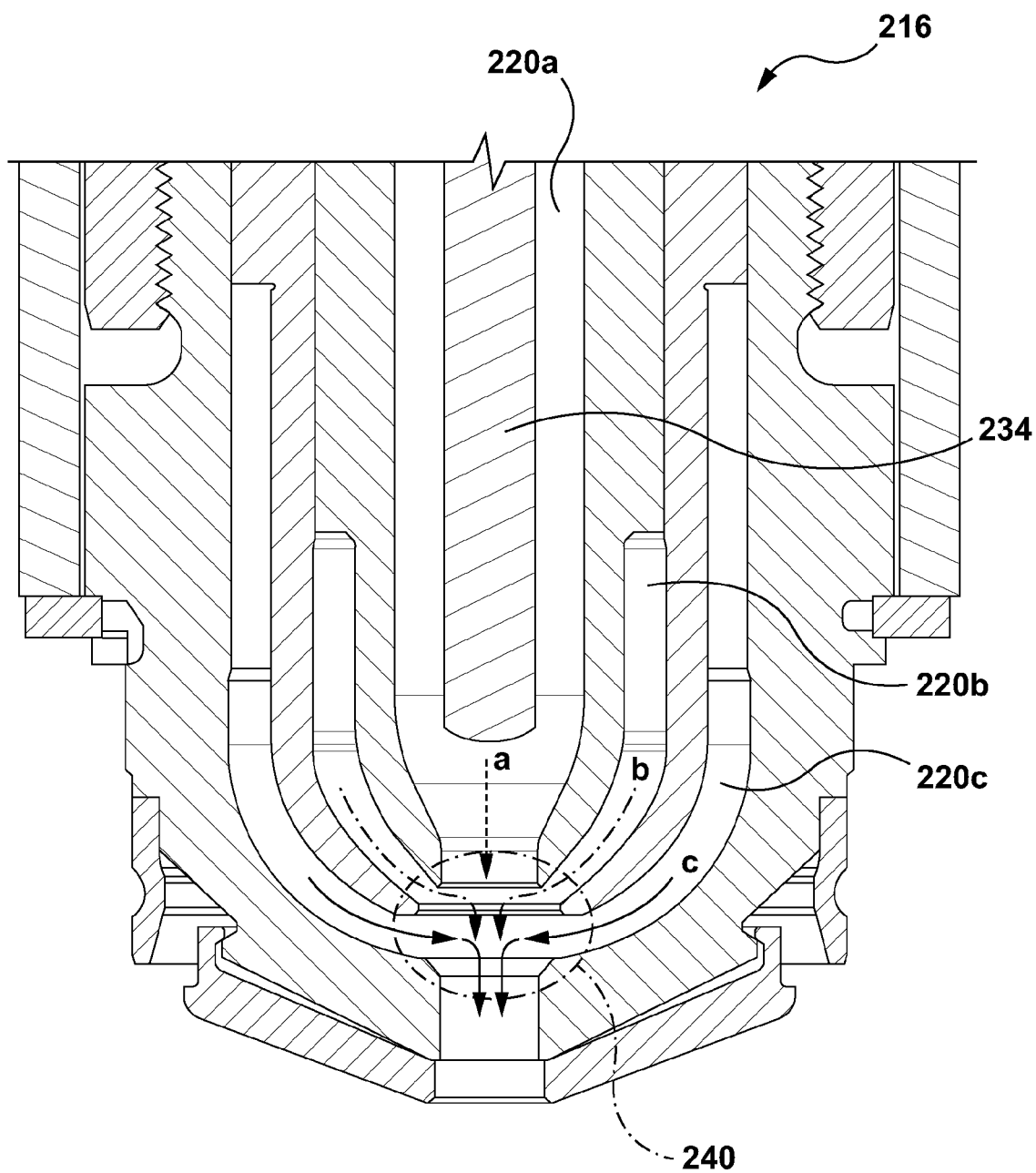
FIG. 5 is an enlarged cross-sectional schematic representation of a downstream end of the co-injection nozzle of FIG. 4, illustrating a flow of melt from melt channels in the nozzle.

In some embodiments, the outlets 236a-236c of the inner, intermediate, and outer melt channels 220a-220c may intersect one another at a combination area 240. In such embodiments, as shown in FIG. 5, the melt exiting the melt channels 220a-220c may intersect each other in this combination area 240. In some embodiments, as shown in FIG. 5, the nozzle is arranged such that melt exiting the outlet 236b of the intermediate channel 220b (see arrow b) simultaneous intersects the melt exiting the outlet 236c of the outer channel 220c (see arrow c) and the melt exiting the outlet 236a of the inner channel 220a (see arrow a). As will be appreciated, in other embodiments, the melt exiting the inner and intermediate channels (see arrows a and b) may intersect one another before intersecting with the melt exiting the outer channel (see arrow c), or melt exiting the intermediate and outer channels (see arrows b and c) may intersect one another before intersecting with the melt exiting the inner channel (see arrow a).

Turing back to FIG. 4, in some embodiments, the inner, intermediate and outer melt channels 120a-120c may be arranged concentrically with respect to one another. For purposes herein, a concentric arrangement may mean that the inner melt channel is substantially frustoconical and nested inside of the intermediate melt channel, which, in turn, is substantially semi-hemispherical and nested inside the outer melt channel, which is also substantially semi-hemispherical. As will be appreciated, one or more of the melt channels also may have different arrangements in other embodiments. For example, one or both of the intermediate and outer melt channels may instead be frustoconical in shape and/or the inner melt channel may be cylindrical in shape.

Figure 6:
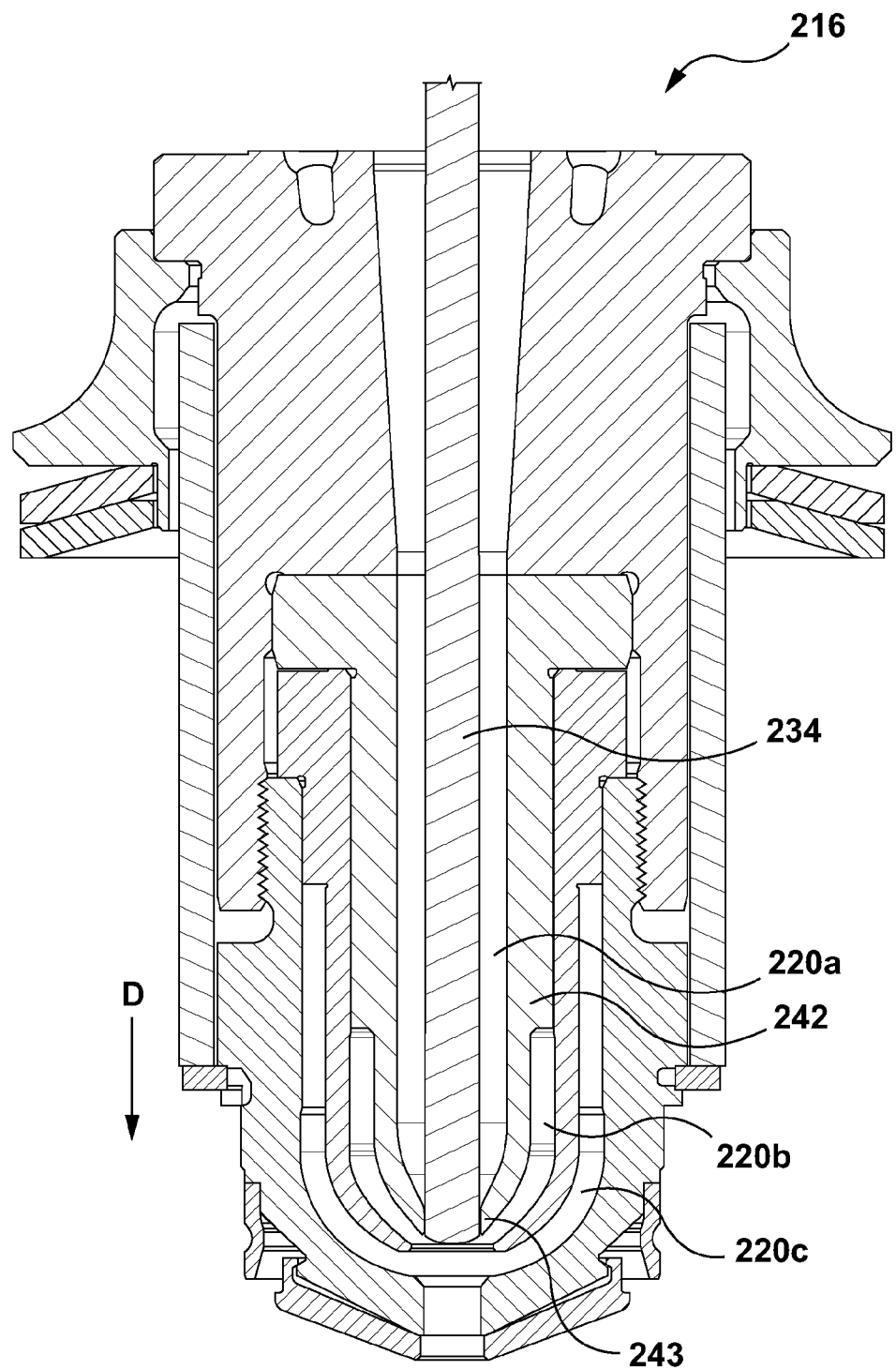
FIG. 6 is a cross-sectional schematic representation of the nozzle of FIG. 4, with the valve stem in a first closed position.
Figure 7:
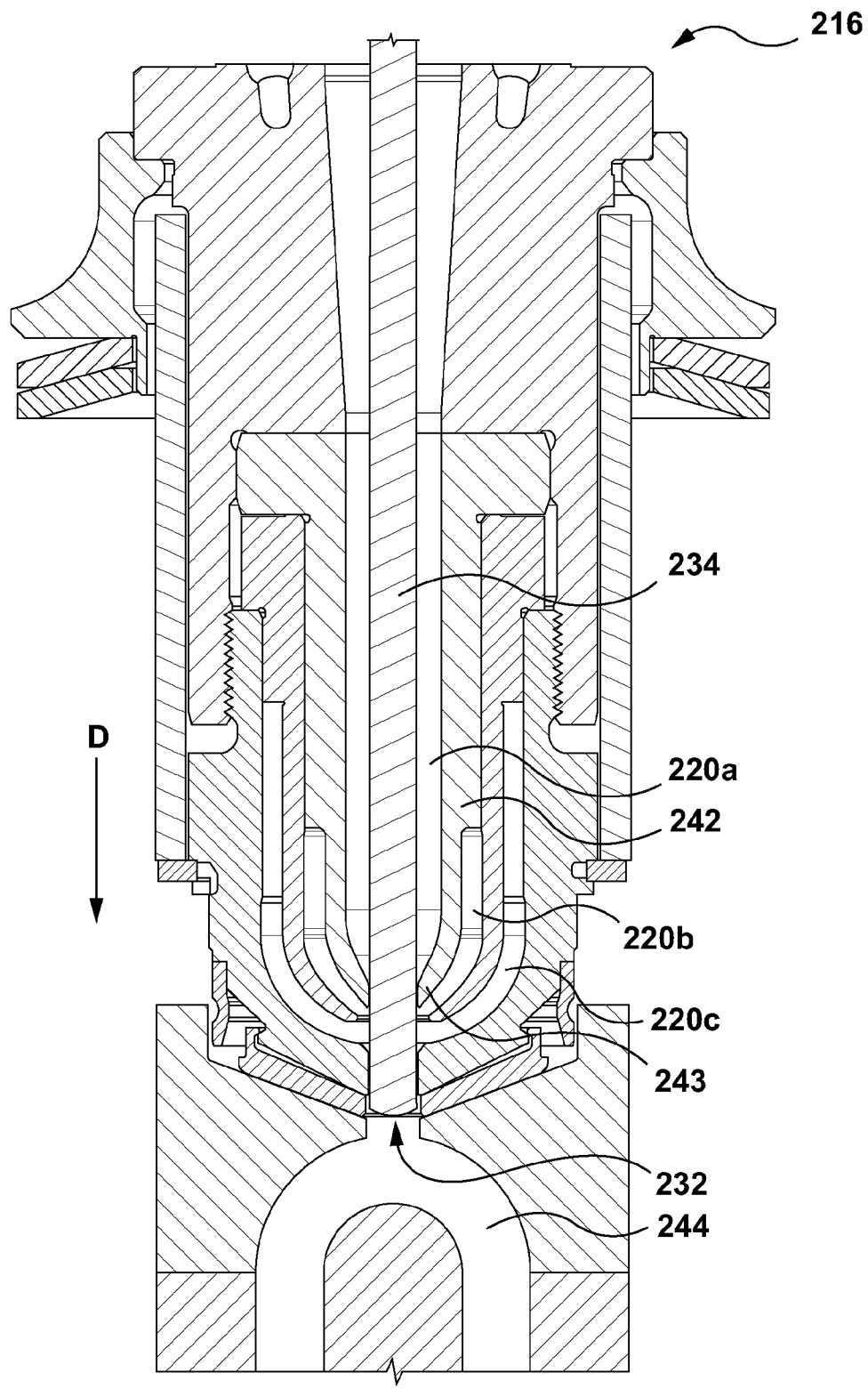
FIG. 7 is a cross-sectional schematic representation of the nozzle of FIG. 4, with the valve stem in a second closed position.

As shown in FIGS. 4 and 6-7, the nozzle includes a valve stem 234 which is slidably received in the inner channel 220a and, as is known, may reciprocate back and forth to stop and start melt flow. In some embodiments, as shown in FIG. 4, when the valve stem 234 is in an upstream or open position, melt may flow out of each of the inner, intermediate and outer melt channels 220a-220c. In such embodiments, melt flow also may be controlled via suitable actuators, as will be appreciated by those of skill in the art. For example, although the valve stem 234 may be in an open position, only a first melt material may flow into and out of the inner and outer channels 220a, 220c. As will be described, a second melt material may flow into and out of the intermediate flow channel at a later point in time.

FIG. 6 shows the nozzle with the valve stem 234 in a first closed position, at a downstream end of the nozzle tip. In one embodiment, as shown in FIG. 6, when the valve stem 234 is in the first closed position, the valve stem 234 only blocks melt flow out of the inner channel. In such an embodiment, a downstream end 243 of the inner channel may have a smaller diameter than the rest of the melt channel, the diameter of the downstream end 243 of the inner channel corresponding to a diameter of the valve stem 234. As a result, when the valve stem 234 moves in a downstream direction (e.g., towards the gate, as illustrated by arrow D), the valve stem may block the outlet of the inner channel 220a.

As shown in FIG. 7, the valve stem 234 may continue moving in a downstream direction (see the arrow labeled D) until the valve stem 234 reaches a second closed position, at the gate 232. In such a second closed position, the valve stem may stop melt flow from each of the inner, intermediate and outer channels 220a-220c to a mold cavity 244. In some embodiments, the gate may be formed in an upstream potion of the mold cavity 244.

As with other embodiments, as is well known, melt flow into the mold cavity also may be controlled via injection pressure control either by the injection screw or shooting pots. For example, in one embodiment, when the valve stem 234 is first moved into the first closed position, as is shown, melt may continue to flow out of only the outer channel 220c. Then, at a later time, while melt continues to flow out of the outer channel 220c, the second melt material may be pressurized to transfer melt into intermediate channel, and from the intermediate channel into the mold cavity.

Figure 8:
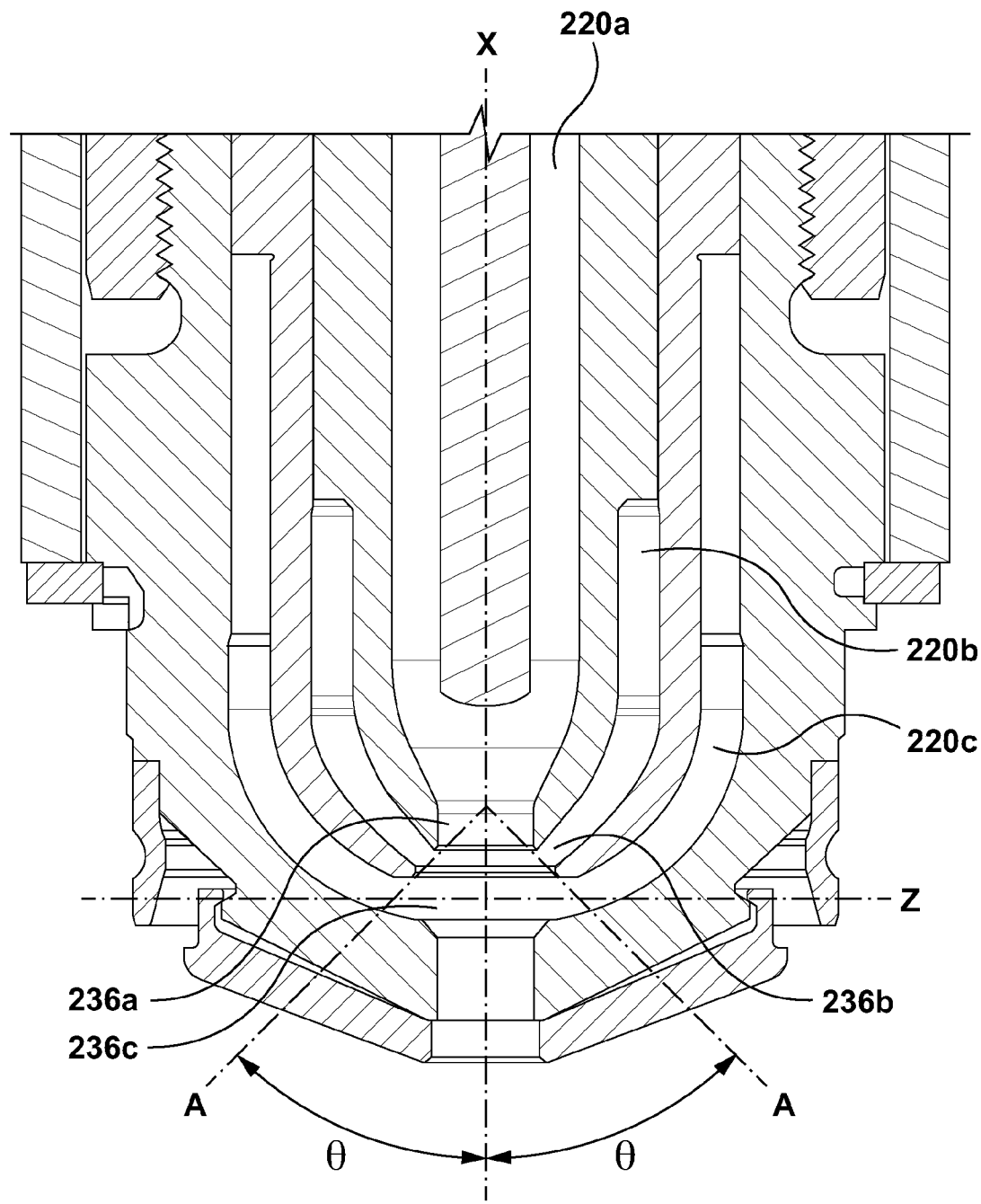
FIG. 8 is an enlarged cross sectional schematic representation of a downstream end of the co-injection nozzle of FIG. 4 according to one embodiment.

Turning now to FIG. 8, in some embodiments, the inner channel 220a is arranged to be substantially perpendicular to the outlets 236c of the outer channels 220c. In other words, a longitudinal axis X of the inner channel 220a may be substantially perpendicular to a longitudinal axis Z of the outlet 236c of the outer channel 220c. In such embodiments, as also shown in FIG. 8, the axis Y of the intermediate channel 220b need not be perpendicular to the longitudinal axis X of the inner channel. For example, the axis Y of the intermediate channel 220b may be offset from the axis of the inner channel 220 by less than 90° (e.g., by between about 25° and 75° degrees, such as by 45°, although other suitable arrangements are possible.

Similar to the above, as also shown in FIG. 8, an axis A of a plane passing through the outlets 236b of the intermediate channel 220b may be offset from the longitudinal axis X of the inner channel. For example, the axis A of the plane passing through each outlet 236b may be offset from the longitudinal axis by an angle θ less than 90° (e.g., between about 25° and 75°, such as by 45°), although other suitable arrangements are possible.

Figure 9A:
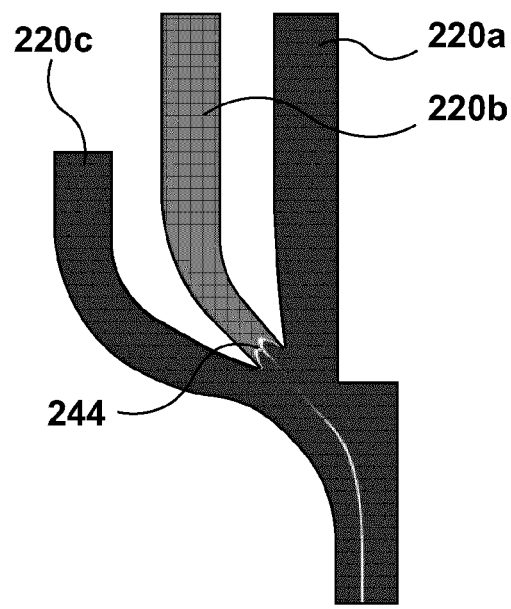
FIGS. 9A-9C are illustrations of melt being pinched off in an intermediate melt channel after injection of the intermediate layer into a mold cavity.
Figure 9B:
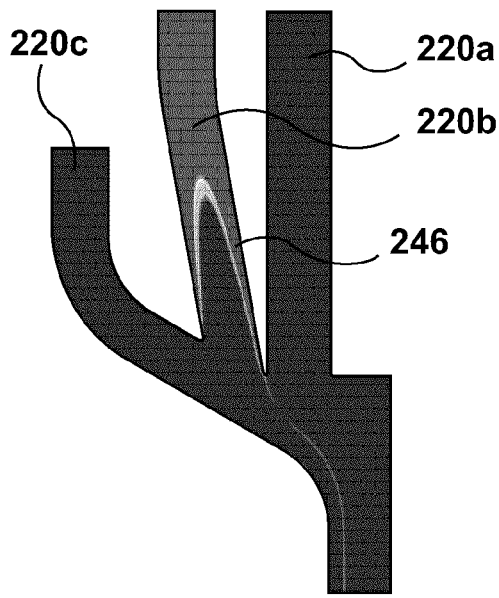
Figure 9C:
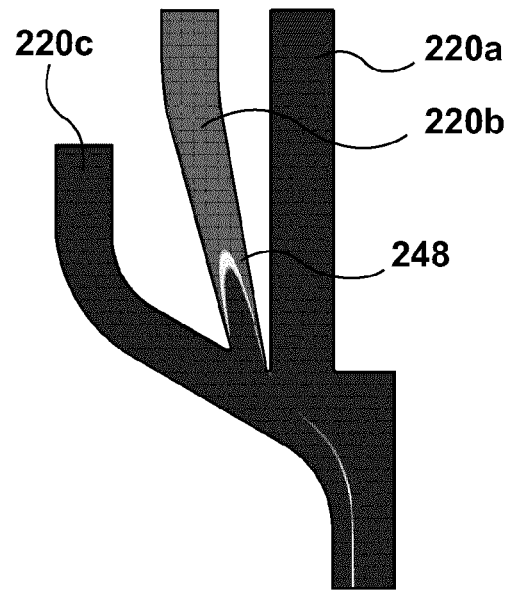

Turning now to FIG. 9A, a flow simulation of the melt from the intermediate channel being pinched to stop melt flow while allowing melt to continue to flow in the inner and outer channels is shown. As illustrated in this view, by including one or more of the above-described features, the melt flow in the intermediate channel may be quickly pinched (e.g., stopped). For example, the melt flow of the intermediate channel may be stopped in about 1.5 sec. Additionally, as shown in this example, the pinched melt flow of the intermediate channel 220b includes a small tail 244 (e.g., about 6 mm long), as compared to what may occur in nozzles having different configurations. For example, as shown in FIGS. 9B and 9C, where the outlets are not all adjacent and the outer channel is not substantially perpendicular to the inner channel, the intermediate channel was not stopped as efficiently nor did it have as small of a tail. For example, in FIG. 9B, the tail is about 20 mm in length, with the pinching occurring in 1.71 seconds. In FIG. 9C, the tail is about 10 mm in length, with the pinching occurring in about 1.64 second.

As also shown in FIG. 9A, during pinching of the intermediate channel, a portion of the melt flowing from the inner and outer channels 220a, 220c may flow into the intermediate channel. As will be appreciated, such movement of the melt from the inner and outer melt channels may minimize contamination by the melt flowing in the intermediate channel.

According to another embodiment, a method of dispensing melt from a nozzle to a mold cavity is disclosed. Such a method may be used, for example, to encapsulate an intermediate layer within the inner and outer layers of a preform (e.g., see FIG. 1A). In some embodiments, the nozzle includes an inner channel, one or more intermediate channels, and an outer channel, with each channel having a respective outlet. In such embodiments, a valve stem is slidably received in the inner channel and is moveable back and forth to start and stop melt flow. In some embodiments, a first manifold transfers melt to the inner and outer melt flow channels and a second manifold transfers melt to the intermediate melt channel. In such embodiment, the method includes moving the valve stem in an upstream direction.

Next, the first melt material may pass into the inner and outer channels and, in turn, into the mold cavity. The valve stem may then be moved in a downstream direction to a first closed position, where the valve stem blocks melt flow out of the inner channel while allowing melt to flow out of the outer channel. A second melt material may then flow into and out of the intermediate channel (e.g., to the melt cavity), while the first melt continues to flow out of the outer channel. After the intermediate layer has finished being injected, the injection pressure is reduced and the melt flow of the intermediate channel may be pinched off in the intermediate channel. Subsequently, the valve stem may again be moved to the open position to allow melt to flow into and out of both the inner and outer channels to complete the injection molding process. The valve stem may then be moved to a second close position, at the gate, where the valve stem blocks flow out of each of the inner, intermediate and outer flow channels.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An injection molding machine having a co-injection nozzle for transferring melt to a mold cavity, the co-injection nozzle comprising:
    a nozzle body having an inner flow channel, an outer flow channel, and at least one intermediate flow channel in between the inner and outer flow channels;
    a valve stem slidably received in the inner flow channel and moveable between an open position and one or more closed positions;

wherein, in a first closed position, the valve stem blocks an outlet of the inner flow channel but does not block an outlet of the outer flow channel or an outlet of the at least one intermediate flow channel;

wherein respective outlets of the inner flow channel, the outer flow channel and the at least one intermediate flow channel are immediately adjacent to one another;

wherein the nozzle body includes a first tip piece separating the at least one intermediate flow channel and the outer flow channel, wherein a downstream end of the first tip piece includes a first knife edge that tapers to a first radiused edge between the respective outlets of the at least one intermediate flow channel and the outer flow channel;

wherein the nozzle body includes a second tip piece separating the inner flow channel and the at least one intermediate flow channel, wherein a downstream end of the second tip piece includes a second knife edge that tapers to a second radiused edge between the respective outlets of the inner flow channel and the at least one intermediate flow channel; and wherein the outlet of the inner flow channel is substantially perpendicular to the outlet of the outer flow channel but is not substantially perpendicular to the outlet of the at least one intermediate flow channel.

2. The injection molding machine of claim 1, wherein the respective outlets of the inner, outer and at least one intermediate flow channels intersect one another at a combination area.

3. The injection molding machine of claim 1, wherein a plane passing through the outlet of the at least one intermediate flow channel is positioned at an angle of less than 90 degrees from a longitudinal axis of the inner flow channel.

4. The injection molding machine of claim 3, wherein the plane passing through the outlet of the at least one intermediate flow channel is positioned at an angle of between about 25 degrees and 75 degrees from the longitudinal axis of the inner flow channel.

5. The injection molding machine of claim 1, wherein, in an open position, melt is capable of flowing out of each of the inner, outer and at least one intermediate flow channels.

6. The injection molding machine of claim 1, wherein the inner, outer and at least one intermediate flow channels are arranged concentrically.

7. The injection molding machine of claim 1, wherein a radius of the second knife edge is the same as a radius of the first knife edge.

8. The injection molding machine of claim 1, wherein a radius of the second knife edge is different than a radius of the first knife edge.

9. The injection molding machine of claim 1, wherein a downstream end of the inner flow channel has a smaller diameter than a remainder of the inner flow channel.

10. The injection molding machine of claim 9, wherein the diameter of the downstream end of the inner flow channel corresponds to a diameter of the valve stem.

11. The injection molding machine of claim 1, wherein a first melt material is transferred to the mold cavity via each of the inner and outer flow channels.

12. The injection molding machine of claim 11, wherein a second melt material is transferred to the mold cavity via the at least one intermediate flow channel, the second melt material being different from the first melt material.

13. The injection molding machine of claim 1, wherein, in a second closed position, the valve stem block outlets of the inner, at least one intermediate, and outer flow channels.

14. An injection molding machine having a co-injection nozzle for transferring melt to a mold cavity, the co-injection nozzle comprising:
a nozzle body having first and second tip pieces, an inner flow channel, an outer flow channel, and at least one intermediate flow channel in between the inner and outer flow channels, the inner, outer and at least one intermediate flow channels being arranged concentrically, with the first tip piece separating the at least one intermediate channel and the outer channel and the second tip piece separating the inner channel and the at least one intermediate channel;
a valve stem slidably received in the inner flow channel and moveable between an open position and one or more closed positions;
wherein, in a first closed position, the valve stem blocks an outlet of the inner flow channel but does not block an outlet of the outer flow channel or an outlet of the at least one intermediate flow channel;
wherein respective outlets of the inner flow channel, the outer flow channel and the at least one intermediate flow channel are immediately adjacent to one another;
wherein the outlet of the inner flow channel is substantially perpendicular to the outlet of the outer flow channel but is not substantially perpendicular to the outlet of the at least one intermediate flow channel;
wherein a downstream end of the first tip piece includes a first knife edge that tapers to a first radiused edge between the outlets of the at least one intermediate flow channel and the outer flow channel; and
wherein a downstream end of the second tip piece includes a second knife edge that tapers to a second radiused edge between the outlets of the at least one intermediate flow channel and the inner flow channel.

15. The injection molding machine of claim 14, wherein the respective outlets of the inner flow channel, the outer flow channel and the at least one intermediate flow channel intersect at a combination area.

16. The injection molding machine of claim 15, wherein in an open position, a stream of melt exiting the at least one intermediate flow channel simultaneously intersects a stream of melt exiting the outer flow channel and a stream of melt existing the inner flow channel.

17. The injection molding machine of claim 14, wherein the first and the second knife edge include a radius at its tip that is between about 0.03 mm and 0.6 mm.

18. The injection molding machine of claim 17, wherein the first knife edge includes a radius of about 0.3 mm and the second knife edge includes a radius of about 0.1 mm.

19. The injection molding machine of claim 17, wherein the radius of the first knife edge is the same as the radius of the second knife edge.

20. The injection molding machine of claim 17, wherein the radius of the first knife edge is different from the diameter of the second knife edge.

21. The injection molding machine of claim 14, wherein, in a second closed position, the valve stem blocks the outlets of the inner, at least one intermediate, and outer flow channels.

22. An injection molding machine having a co-injection nozzle for transferring melt to a mold cavity, the co-injection nozzle comprising:
a nozzle body having an inner flow channel, an outer flow channel, and at least one intermediate channel in between the inner and outer flow channels;

a valve stem slidably received in the inner flow channel and moveable between an open position and one or more closed positions;

wherein, in a first closed position, the valve stem blocks an outlet of the inner flow channel but does not block an outlet of the outer flow channel or an outlet of the at least one intermediate flow channel;

wherein, in the open position, a stream of melt exiting the at least one intermediate flow channel simultaneously intersects a stream of melt exiting the outer flow channel and a stream of melt existing from the inner flow channel;

wherein the nozzle body includes a first tip piece separating the at least one intermediate flow channel and the outer flow channel, wherein a downstream end of the first tip piece includes a first knife edge that tapers to a first radiused edge between the respective outlets of the at least one intermediate flow channel and the outer flow channel;

wherein the nozzle body includes a second tip piece separating the inner flow channel and the at least one intermediate flow channel, wherein a downstream end of the second tip piece includes a second knife edge that tapers to a second radiused edge between the respective outlets of the inner flow channel and the at least one intermediate flow channel; and wherein respective outlets of the inner flow channel, the outer flow channel and the at least one intermediate flow channel are immediately adjacent to one another; and wherein the outlet of the inner flow channel is substantially perpendicular to the outlet of the outer flow channel but is not substantially perpendicular to the outlet of the at least one intermediate flow channel.

23. The injection molding machine of claim 22, wherein respective outlets of the inner flow channel, the outer flow channel and the at least one intermediate flow channel intersect at a combination area.

24. The injection molding machine of claim 22, wherein respective outlets of the inner, outer and at least one intermediate flow channels are arranged concentrically.

25. The injection molding machine of claim 22, wherein the stream of melt exiting the outer and inner flow channels includes a first melt material.

26. The injection molding machine of claim 22, wherein the stream of melt exiting the at least one intermediate flow channel includes a second melt material, the second melt material being different from the first melt material.

27. The injection molding machine of claim 22, wherein a radius of the first knife edge is the same as a radius of the second knife edge.

28. The injection molding machine of claim 22, wherein a radius of the first knife edge is different from a radius of the second knife edge.

29. The injection molding machine of claim 22, wherein, in a second closed position, the valve stem blocks the outlets of the inner, at least one intermediate, and outer flow channels.

\* \* \* \* \*